Patented Nov. 6, 1928.

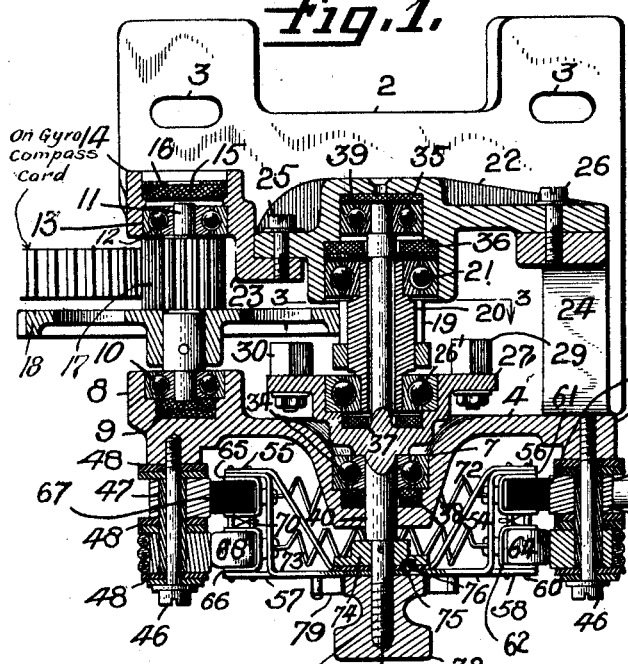

1,690,545

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

GYROCOMPASS TRANSMITTER.

Application filed October 9, 1922. Serial No. 593,216.

My invention relates to transmitters and has for its object the provision of an improved device of this character. More specifically, my invention has reference to an improved transmitter for gyro-compasses in which means are provided to permit freely the constant hunting action of the compass card without actuating the transmitter, and to actuate the apparatus to transmit accurately compass readings at the same time. A gyro-compass comprises a sensitive element and a follow-up device which in addition to carrying the compass card actuates the mechanism employed to transmit the compass readings to various parts of the ship. The principal purpose of the follow-up device is to relieve the sensitive element of the necessity of doing work during its apparent arc-in-azimuth movements. The cause that gives most trouble in this regard is friction about the vertical axis. To eliminate this trouble, means are provided to prevent the follow-up device from coming to a condition of complete rest. Preferably, the entire follow-up system is caused to oscillate through a small arc, thereby causing the compass card to oscillate through about one degree, which movement is generally designated as the hunting action of the compass card. A more detailed description of the follow-up system described may be had by referring to Patent 1,300,890, of Elmer A. Sperry, issued April 15, 1919. In carrying out my invention, I provide means between my contact making mechanism and the connection of my transmitter with the follow-up device, whereby there is a lost motion equal to the hunting motion of the follow-up device. As to this feature, this application is a continuation in part of my co-pending application for direct current gyrocompasses, serial #452,505, filed March 15, 1921, showing this idea as applied to a gyroscopic compass. Other novel features of my invention reside in the construction and arrangement of parts.

My invention will be better understood from the following description taken in connection with the accompanying drawings, and its scope will be pointed out in the appended claims.

In the drawings, illustrating what I now consider a preferred form of my invention, Fig. 1 is a vertical section of a transmitter embodying my invention, taken on approximately line 1—1 of Fig. 2 looking in the direction of the arrows.

Fig. 2 is a plan view of Fig. 1 as seen from its bottom side.

Fig. 3 is a detail taken on the line 3—3 of Fig. 1, illustrating the driving element in one position in full lines and in another position in dash lines.

Fig. 4 is an end view of the driving element, and,

Fig. 5 is a wiring diagram of my transmitter shown connected to a repeater motor.

Referring now to the drawings the numeral 1 indicates the frame for supporting the several elements comprising my improved transmitter. This frame may be a unitary casting formed with an upright wall 2, having suitable openings 3 therein for bolting or otherwise suitably securing the transmitter to a gyro-compass, or other actuating apparatus. The base 4 of the frame is formed with a ring 5, having a spider 6 supporting a cup-shaped element 7 concentric with said ring. On its upper surface and near its edge, the base 4 is provided with an upwardly extending member 8, which has a central bore to form a seat for oil pads 9, and is suitably counterbored to accommodate ball bearings 10, for a shaft 11. The opposite end of said shaft is journaled in ball bearings 12, located in an opening 13 of an arm 14 formed on the wall 2. An oil pad 15, located within the opening 13, adjacent the bearings 12, is held in position by a washer 16. Oil pads 9 and 15 are provided to lubricate the bearings 10 and 12 in a manner readily understood. Fixed on the shaft 11 are two gears 17 and 18. When my transmitter is secured in operative position on a gyro compass, the gear 17 is in mesh with a gear carried by the follow-up device of a gyro-compass, that is, the follow-up device actuates my transmitter through gear 17.

The gear 18 meshes with a gear 19 formed on a cylindrical member 20, which is journaled at its upper end in ball bearings 21, located in a suitable bore on a member 22. The member 22 is supported by a flange 23 formed on the member 14, and by a member 24 formed on the base 4 diametrically opposite the member 14, and may be secured to the members 14 and 24 by screws 25 and 26 respectively, as shown in Fig. 1. Below the gear 19, the cylindrical member 20 carries a driving element 25', which, as shown in Fig. 3, is in the form of a rectangle. Further reference to the driving element 25' will be made hereinafter. At its lower end the cylindrical member 20 is journaled in ball bearings 26', suitably located on a member 27 which is carried by a shaft 28. As shown in Fig. 3, the member 27 carries two stops 29 and 30, positioned diametrically opposite each other with respect to the shaft 28. Preferably the stops 29 and 30 have a rectangular cross-section, and are positioned with the lines representing one of their diagonals coincident with the center line on which said blocks and shaft 28 are located. From the foregoing, it will be observed that the driving element 25' may be driven through gears 17, 18 and 19, in either direction, until the stops 29 and 30 are engaged without imparting rotation to the shaft 28. Therefore, motion transmitted to gear 17 by the hunting action of the gyro compass will not impart rotation to the shaft 28, it being understood, of course, that the gear ratio, and the limit of motion of the element 25' between the stops 29 and 30 are designed to permit a movement equal to that of the hunting action. By this arrangement, the element 25' may be oscillated about the shaft 28 between the position shown in full lines in Fig. 3, and the position indicated in dash lines, indicated at 25''. Any movement additional to the hunting action transmitted by the follow-up device to the gear 17 will impart a corresponding rotation to the shaft 28. In order to absorb the shocks between the element 25' and stops 29 and 30, I preferably form the four corners of said element with a suitable cushioning material, such as leather. As shown in Figs. 3 and 4, the ends of said element may be slotted and a strip of leather 31 inserted in the slots, and held in position by a pin 32, and overlapping the ends of the slotted portion as indicated at 33.

The shaft 28 near its lower end is journaled in ball bearings 34, located on the member 7, and at its upper end in ball bearings 35, located on the member 22, as shown in Fig. 1. The bearings 21, 26', 34 and 35 are provided with lubricating pads 36, 37, 38 and 39, respectively, similar to pads 9 and 15 previously described.

The shaft 28 extends through an opening 40 in the cup shaped element 7, and on its projecting portion carries the movable elements of the contact mechanism, to which further reference will be made hereinafter.

The fixed elements of the contact mechanism are in the form of two parallel rings, with the shaft 28 as a center, connected to the respective mains, the connections between the rings being controlled by the movable elements carried on said shaft. As shown in Figs. 1 and 5, the upper ring 41, is a continuous copper ring, having a terminal post 42, connected to the main 43, of a suitable source of current 44. The lower ring, best illustrated in Figs. 2 and 5, consists of a plurality of spaced segments 45, of which twelve are shown. The upper ring 41 and the segments 45 forming the lower ring are secured to the ring portion 5 of the frame 1, by a plurality of screw bolts 46, which are surrounded by suitable insulating sleeves 47. The ring contact 41 and contact segments 45 are insulated from each other and other parts of the apparatus by suitable insulating washers 48, as shown in Fig. 1. Preferably two bolts 46 are employed for each segment 45. Since the transmitter illustrated is employed with a 6 pole repeater motor 49, as shown in Fig. 5, three terminal posts 50, 51 and 52 are provided and electrically connected to the poles A, B and C respectively of the motor 49. The poles A', B', and C' are connected to the main 50 of the source 44. Since there are three terminals 50, 51 and 52, and twelve segments 45, four segments are connected to each post, that is, every fourth segment. As shown in Fig. 5, segments $50^a$, $50^b$, $50^c$, and $50^d$, are connected to terminal 50; $51^a$, $51^b$, $51^c$, and $51^d$ to terminal 51; and $52^a$, $52^b$, $52^c$ and $52^d$ to terminal 52.

The movable elements of the contact mechanism are carried by a frame 71 formed with members 53 and 54. The member 53 is bent upwardly at each end to form L shaped members 55 and 56 and at its lower end is formed with ears 57 and 58. Axles 59 and 60 are supported by member 55 and ear 57, and by member 56 and ear 58 respectively, as shown in Fig. 1. The member 54 is bent upwardly on each side to reinforce the L shaped members 55 and 56 respectively. Pivotally mounted on the axle 60 are carriages 61 and 62. The carriage 61 has a sliding contact block 63 and the carriage 62 has a roller contact 64. The axle 59 has similar carriages 65 and 66 having similar contacts 67 and 68, respectively. The contacts 63 and 64, and 67 and 68 are electrically connected by conductors 69 and 70 respectively. The ends of the carriages 61 and 65 are connected by a spring 72, and carriage 62 and 66 are similarly connected by a spring 73. A small disc 74 is fixed on the shaft 28 and has an opening 75. The member 53 is provided with a pin 76 to engage said opening. The frame 71 may be placed in position on the transmitter by placing it on the shaft 28 and engaging pin 76 in hole 75, which prevents its rotation except with the shaft 28. In order to hold it in this position, the end of the shaft may be threaded as at 77 to receive a knurled nut 78. This nut is held in its position by a leaf spring 79 bearing against the knurls thereof. When the frame 71 is in this position, the sliding block contacts 63 and 67 engage the contact ring 41, and the roller contacts 64 and 68 ride successively over the contact segments 45, which have been numbered as 50, 51 and 52, $a$ to $d$ inclusive in Fig. 5, to better illustrate their connection with the respective terminals. The springs 72 and 73 will normally urge the block contacts 63 and 67, and the roller contacts 64 and 68 respectively, against their fixed contacts. It will be observed that in one case sliding block contacts have been employed. If roller contacts were employed in both cases, the contacts might be moved by the vibrations of the ship, or by the impulses of the member 25' as it oscillates between the stops 29 and 30. The tension of the spring 72 therefore is such as to create a friction between the sliding blocks 63 and 67, and the fixed contact ring 41 of sufficient value to overcome these normal vibrations and impulses.

In view of the foregoing detailed description, the operation of my invention may readily be understood from a brief description thereof.

As above indicated, the gear 17 is actuated by the follow-up device of a gyro compass, which normally oscillates. Motion is transmitted from the gear 17 to gear 19 through gear 18. The gear 19 carries the driving element 25' which is designed to oscillate between stops 29 and 30, the limit of movement between said stops corresponding to the hunting action of the compass card. The impulses incident thereto are absorbed by the buffers 31 and rotation of the member 27 is prevented by the friction of contacts 63 and 67. When the compass card moves beyond the limit of the hunting action, such movement is transmitted in the manner indicated, which rotates member 27, fixed on the shaft 28. The rotation of the shaft 28 rotates the frame 71, which carries the movable contacts. From Fig. 2, it will be seen that the contacts 64 and 68 are located on a line parallel to a line passing through the center of rotation of the frame 71, whereby one of the rollers may pass from one segment 45 to another, while the other roller remains on one segment. This will be better understood by referring to Fig. 5. Let it be assumed that the frame 71 is rotating anti-clockwise and that roller 68 is just leaving contact segment $52^d$. The contact blocks 63 and 67 continuously engage fixed contact 41 connected to main 43. The roller 68 now engages contact $50^a$ and roller 64 engages contact $50^c$ in which case poles A, A' are energized. Continuing the rotation, the roller 68 moves on the second half of contact $50^a$ and roller 64 moves on the first half of contact $51^c$, energizing poles A, A' and B, B'. In the next position, the roller 68 moves in the first half of contact $51^a$ and the roller 64 moves on the second half of contact $51^c$ energizing poles B, B' of the repeater motor, and so on, whereby two positions per pole of the repeater motor are obtained. Of course, the number of poles of the repeater motor, and the contacts of and connections with the transmitter may be varied to meet the particular requirements. It will also be seen that by the arrangement described, I obtain clean contact surfaces at all times, and that any dirt accumulating thereon will be wiped off by the moving contacts and may drop out of the transmitter. The frame 71 may be readily removed by unscrewing the nut 78, for the purpose of making adjustments or replacing parts. It will thus be seen that I have provided a rugged, compact and efficient transmitter to overcome the difficulties referred to.

In accordance with the provisions of the patent statutes, I have herein described the principle of operation of my invention, together with the apparatus, which I now consider to represent the best embodiment thereof, but I desire to have it understood that the apparatus shown in only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is, 1. A step by step transmitter for repeating at a distance the movements of a sending instrument, comprising a plurality of fixed contacts, a rotatable element, movable contacts actuated by said element, a pair of fixed stops carried by said element having a rectangular cross section and located on a line passing through the center of rotation of said element on opposite sides thereof, a second rotatable element concentric with said first element, a rectangular member fixed thereon arranged to engage said stops, said member being designed to have a predetermined free movement before engaging said stops and means for rotating said second element.

2. A transmitter comprising a rotatable element, a plurality of fixed contacts concentrically arranged with respect to said element and adapted to be electrically connected to one side of the source of energy, a fixed ring contact concentric with said element connected to the other side of said source, a member actuated by said element having arms oppositely extending from the center of rotation, a lost motion connection between said member and element, a roller contact pivotally mounted on each end of said member, means urging said rollers into engagement with said first mentioned contacts, a sliding contact pivotally mounted on each end of said member, means urging said sliding contacts into engagement with said ring contact and electrical connections between the roller contact and the sliding contact at the respective opposite ends of said member.

3. A transmitter comprising a plurality of concentrically arranged fixed contacts, a spaced concentric ring, a rotatable element cooperating with said contacts and ring, including a roller contact and a sliding contact mounted on said element and adapted to engage said fixed contacts and ring, a lost motion connection between said element and its actuating device, and yielding means for urging the contacts on said element into engagement with said fixed contacts and ring.

In testimony whereof I have affixed my signature.

CHESTER B. MILLS.